United States Patent [19]

Masuda

[11] Patent Number: 6,058,080
[45] Date of Patent: May 2, 2000

[54] DISC-POSITION DISPLAY FOR AUTO DISC CHANGER

[75] Inventor: Akira Masuda, Tochigi, Japan

[73] Assignee: Aiwa Co., Ltd., Tokyo, Japan

[21] Appl. No.: 08/529,667

[22] Filed: Sep. 18, 1995

[30] Foreign Application Priority Data

Sep. 22, 1994 [JP] Japan .................................. P6-228272
Nov. 30, 1994 [JP] Japan .................................. P6-297442

[51] Int. Cl.$^7$ ................................................. G11B 17/04
[52] U.S. Cl. ............................................................ 369/36
[58] Field of Search .................................. 362/296, 297, 362/341, 346, 86; 360/137; 369/30, 34, 36; 313/500; 257/88

[56] References Cited

U.S. PATENT DOCUMENTS

| | | | |
|---|---|---|---|
| 4,539,663 | 9/1985 | Ishibashi et al. | 369/34 |
| 4,685,095 | 8/1987 | Rudy et al. | 369/36 |
| 4,853,916 | 8/1989 | Tomita | 369/36 |
| 4,929,866 | 5/1990 | Murata et al. | 313/500 |
| 5,084,859 | 1/1992 | Ishibashi et al. | 369/36 |
| 5,130,761 | 7/1992 | Tanaka | 313/500 |
| 5,270,989 | 12/1993 | Kimura | 369/37 |

FOREIGN PATENT DOCUMENTS

| | | |
|---|---|---|
| 0 265 269 | 4/1988 | European Pat. Off. . |
| 0 267 547 | 5/1988 | European Pat. Off. . |
| 0 284 445 | 9/1988 | European Pat. Off. . |
| 0 535 640 | 4/1993 | European Pat. Off. . |
| 0 632 444 | 1/1995 | European Pat. Off. . |
| 38 18 502 | 3/1989 | Germany . |
| 43 41 362 | 8/1994 | Germany . |
| 2241819 | 9/1991 | United Kingdom . |
| 2266404 | 10/1993 | United Kingdom . |
| 92/04715 | 3/1992 | WIPO . |

Primary Examiner—David D. Davis
Attorney, Agent, or Firm—Smith-Hill and Bedell

[57] ABSTRACT

In order to determine the presence of the discs 12, each of the discs is pushed out for a predetermined distance from the inner side portal of a stocker by a rotation lever. When the disc is pushed out, the transmission of light from a disc presence detection sensor is obstructed, so that the presence of the discs is detected. When the disc tray is opened, the disc is prevented from accidentally falling due to the disc stopper of the carriage and with the regulation bar of the carriage. When two discs are placed on the disc tray, the lower disc is drawn out between side regulators, and the upper disc is not drawn out due to contact with the disc transfer prevention parts. When a LED is lighted, the light is reflected on each of the light reflectors formed on the display plate next to the discs. With such light, the position of discs corresponding to each of the light reflectors can be accurately confirmed.

15 Claims, 6 Drawing Sheets

DISC-POSITION DISPLAY FOR AUTO DISC CHANGER

BACKGROUND OF THE INVENTION

1. Field of the Invention

The present invention relates to an auto disc changer which can store a large number of audio discs and play back the discs one at a time.

The present invention relates to a disc confirmation apparatus for disc stocker which is suitable for an auto disc changer.

2. Description of the Related Art

When the number of discs which can be stored in the stocker is greatly increased, for example, up to 100 discs, it becomes impossible for the user to confirm the position in which the discs are stored and from which a disc can be removed merely by looking. Accordingly, it is necessary to perform a mapping process by which data relating to discs already stored in the disc storage positions in the stocker are recorded in a memory in advance.

Such mapping process is performed using a means which determines the presence of the discs in such positions, which means may be a device using an optical sensor in the each disc storage position, or a device using an optical isolator or a mechanical switch.

However, when optical sensors are attached to all of the disc storage positions, the size of the unit cannot be minimized because the intervals between the shelves of the stocker must be set wide enough to allow for such sensors. In order to minimize the size of the unit, the number of the stored discs would have to be decreased.

If the optical sensors are attached to each of the disc storage positions, the number of the parts is increased in relation to the number of the stored discs, the manufacturing process is difficult, and the cost is increased.

With auto disc changers currently in use, a disc is placed in the disc tray, the disc tray is closed, and the disc is played back or is stored in a specific position in a stocker. The stocker has disc storage positions (shelves) which can store a number of the discs.

With such auto disc changer, when a disc accidentally slips while inside the unit, the disc falls into the unit and the changer may be broken.

In order to avoid this, a stopper may be attached to the rear end of the disc tray which stopper is raised when the disc tray is opened. For example, such stopper may be attached to the inner side portal of the disc tray and when a disc is stored in the unit, the stopper is raised. As the disc tray is being closed, the stopper is lowered to a rest position. The stopper is lowered because it may be necessary to transfer the disc between the carriage and the disc tray when the disc tray is completely closed.

However, with the auto disc changer using the stopper described above, when the disc is roughly placed on the disc tray, the disc may accidentally moves over the top of the stopper and fall into the bottom of the unit. In such situation, the disc is damaged and the auto disc changer may be broken. When the unit is jolted or the unit is tilted for some reason while the disc tray is closing, the disc may be accidentally knocked into the bottom of the unit because the stopper is lowered while the disc tray is closing.

Additionally, a pair of regulators is attached to the right and left sides of the inner side portal of the disc tray, in order to hold a disc in position. The disc regulators are rotatably attached and are biased toward the inside.

Such disc regulators come in contact with the edge of the disc in order to hold the disc while the disc tray is being opened or closed. The disc regulators are rotated outward only when the disc is transferred to and from the disc tray.

However, with the conventional disc tray, when two discs are accidentally placed on the disc tray, the discs will not be correctly loaded and removed.

The carriage can store only one disc, and accordingly, when two disc are placed in the disc tray and simultaneously moved to the carriage, the discs will collide with the portal of the carriage and may be damaged, and the auto disc changer may also be broken.

For example, an auto disc changer 910 currently in use which can store a number of discs 12 and can play back one of the discs 12 at a time, is shown in FIG. 1. Such an auto disc changer 910 has a disc stocker 913 in which a number of discs 12 can be stored at disc storage positions 913A, a carriage 914 which transfers a specified disc 12, a playback block (not shown) for playing back the specified disc 12, and a control block, in a cabinet 911. A transparent window 915 through which the user can see the stored discs 12 is formed into the front panel 911A of the cabinet 911. A tray 916 which loads and removes the discs 12 is positioned below the window 915. A display 917, which indicates the number representing the disc storage positions 913A in which the discs 12 are stored, and operation keys 918 are positioned at the right side of the transparent window 915.

Generally, with the conventional auto disc changer 910, lines 919 indicating the positions of the discs 12 are printed beside the transparent window 915. A longer line is often used to indicate every set of ten discs 12. For example, if the user wishes to confirm that a disc 12 is stored in the 65th level from the bottom, it is easy to locate the 60th level using the longer lines 919 and then count up 5 lines. It is unnecessary to count 65 lines 919 from the bottom. Thus, the user can more easily confirm the position.

However, when such position lines 919 are directly printed on the transparent window 915 with white or black ink, or when a seal on which such lines 919 are printed is laminated onto the transparent window 915, the problems described below arise. In the case of lines 919 that are directly printed onto the window 915, there is generally a wide gap between such window 915 and the discs 12. Accordingly, when the user looks at both the lines 919 and the discs 12 from an angle, the lines 919 may deviate from the corresponding positions of the discs 12. When the seal is laminated onto the window 915, the seal may obstruct the view of the inside, and the user may not be able to confirm whether or not a disc 12 is stored in a specific disc storage position. In order to avoid this, a seal on which pointers 920 are printed may be used on the window 915. However, because the pointers 920 are also much separated by a distance from the discs 12, it again may be difficult to determine which pointer 920 corresponds to which discs 12.

OBJECT AND SUMMARY OF THE INVENTION

An object of the present invention is to provide an improved disc confirmation apparatus for the disc stocker which allows the user to confirm where discs are stored.

In accordance with this another aspect of this invention, as shown in FIG. 1 and FIG. 2, a disc confirmation apparatus 902 is positioned adjacent to the discs 12 inside the unit so as to be visible from the transparent window 915. V-shaped cuts are formed into the transparent display plate 921 of the disc confirmation apparatus 902 and such V-shaped cuts constitute first and second light reflectors 930 and 931. As shown in FIG. 6, when an LED 922 is lit, the light is transmitted through the display plate 921 to each of the light reflectors 930 and 931, and the light is reflected to the front of the unit. The light reflected by the light reflectors 930 and 931 can be easily seen, and the presence of the discs 12 in the positions corresponding to each of the light reflectors 930 and 931 can be accurately confirmed.

Additional objects and advantages of the present invention will be apparent from the following detailed description of a preferred embodiment thereof, which is best understood with reference to the accompanying drawings.

DESCRIPTION OF THE PREFERRED EMBODIMENT

An auto disc changer with a disc confirmation apparatus for a disc stocker according to the present invention in a preferred embodiment is described below with reference to the drawings. The same reference numbers are employed to designate like parts and a detailed description is omitted.

Figure 1:
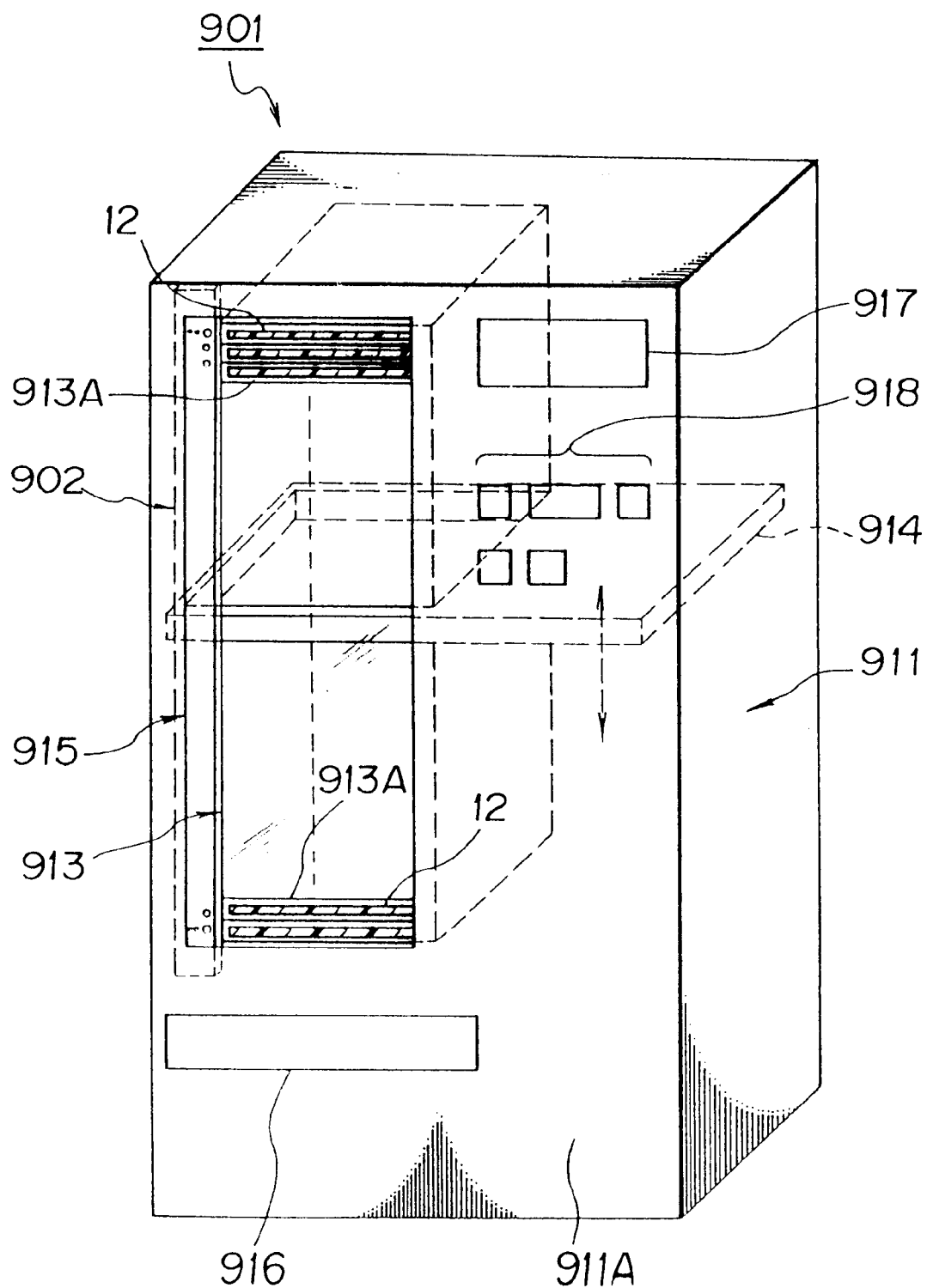
FIG. 1 is a perspective view showing an auto disc changer with a disc confirmation apparatus according to the present invention.
Figure 9:
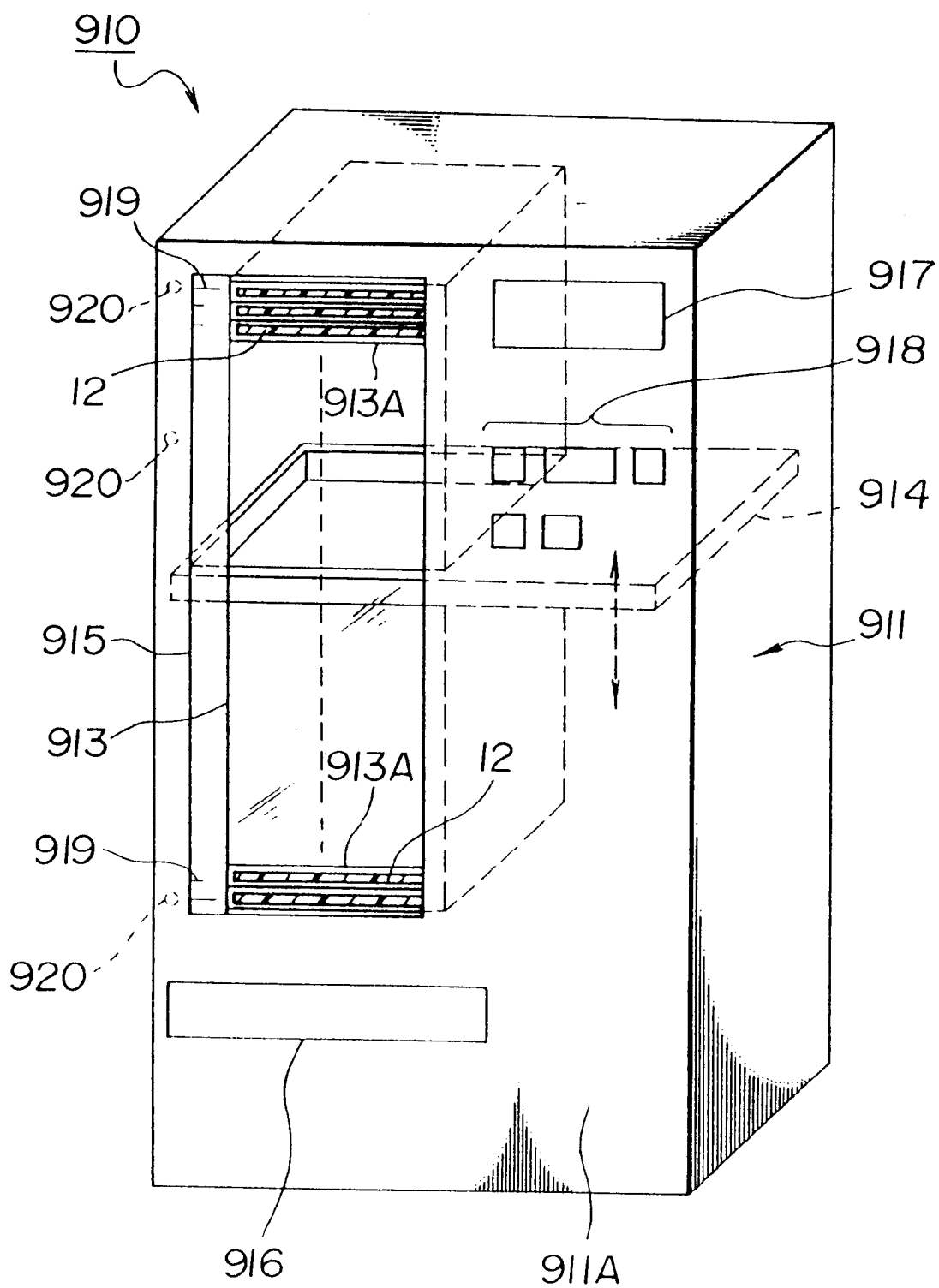
FIG. 9 is an auto disc changer 10 currently in use.

FIG. 1 is a perspective view showing a construction of the auto disc changer 901 with the disc confirmation apparatus according to the present invention. As with the conventional auto disc changer 10 (FIG. 9), the auto disc changer 901 according to the present invention has a disc stocker 913 in which a number of discs 12 can be stored, a carriage 914 which transfers a specified discs 12, a playback block (not shown) for playing back a specific disc 12, and a control block, all located in a cabinet 911. A tray 916 which loads and removes the discs 12 is positioned below the window 915. A display 917, which indicates the number representing the disc storage positions 913A in which a disc 12 is stored, and operation keys 918 are positioned at the right side of the transparent window 915.

Figure 2:
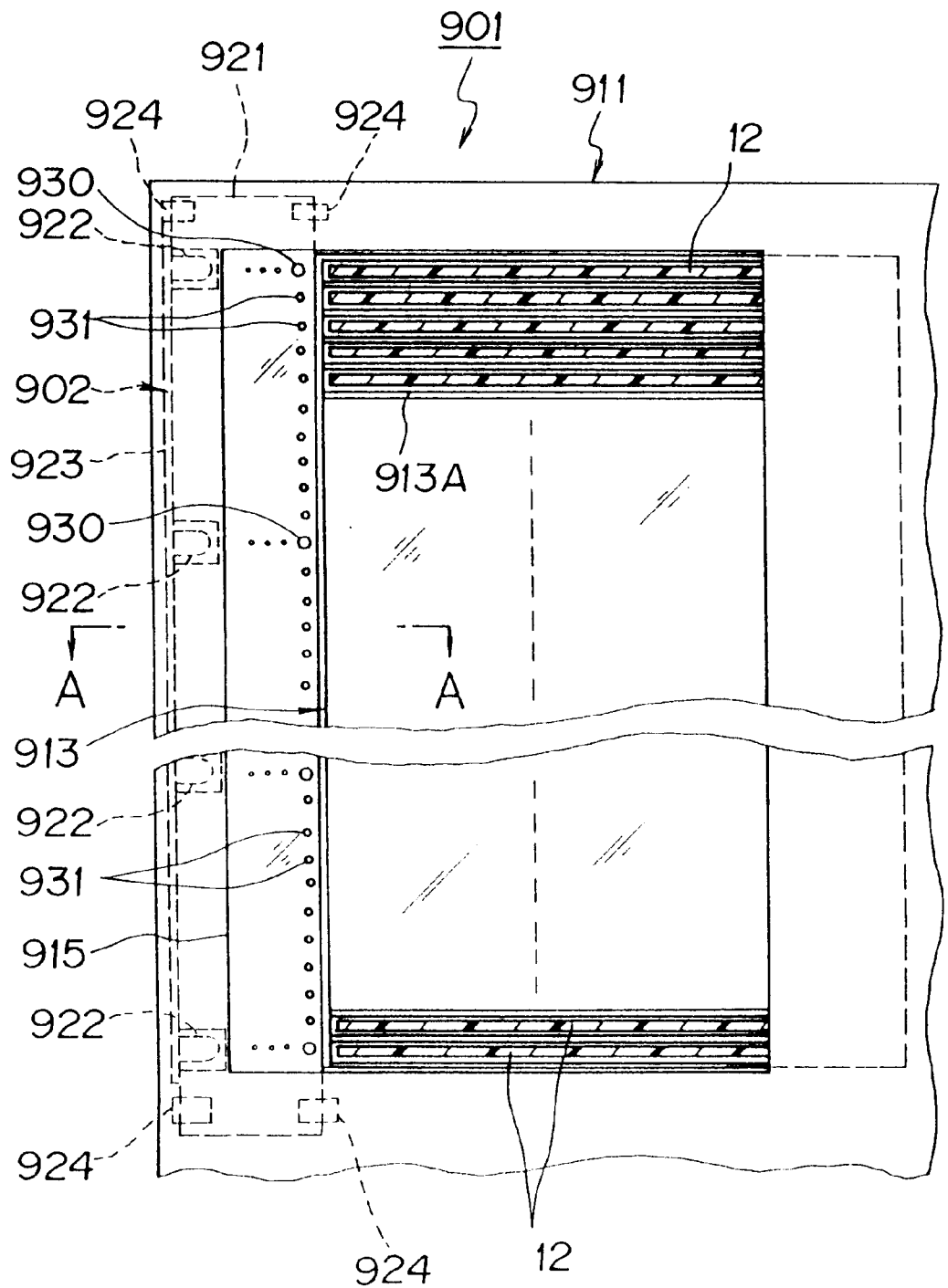
FIG. 2 is a frontal view of the disc confirmation apparatus of the present invention.
Figure 3:
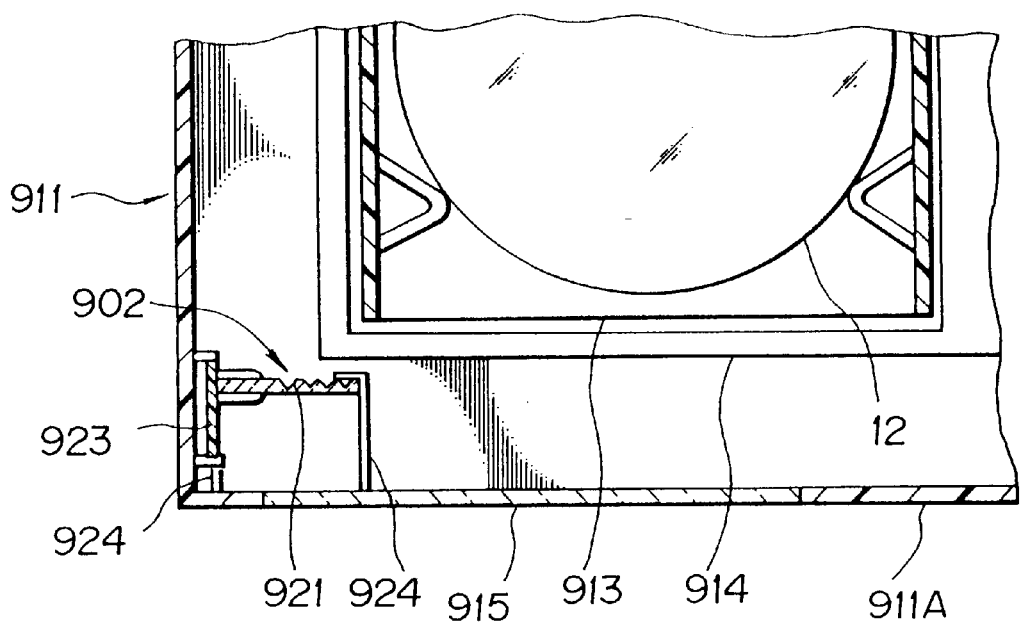
FIG. 3 is a cross-sectional view from line A—A of FIG. 2.

Further, with the auto disc changer 901 according to the present invention, the disc confirmation apparatus 902 by which the user can confirm the presence of stored discs 12 in the stocker 913, is positioned adjacent to the stocker 913 inside the unit so as to be visible from the transparent window 915 as shown in FIG. 2 and FIG. 3. In this embodiment, the disc confirmation apparatus 902 is positioned adjacent to the discs 12 in the stocker 903 from a frontal point of view. The disc confirmation apparatus 902 is comprised of a display plate 921 the height of which is at least equal to the height of the stocker 913, a number of light-emitting means, for example, LEDs 922 which are positioned at regular intervals on the display plate 921, and a board 923 which controls the LEDs 922.

Figure 4:
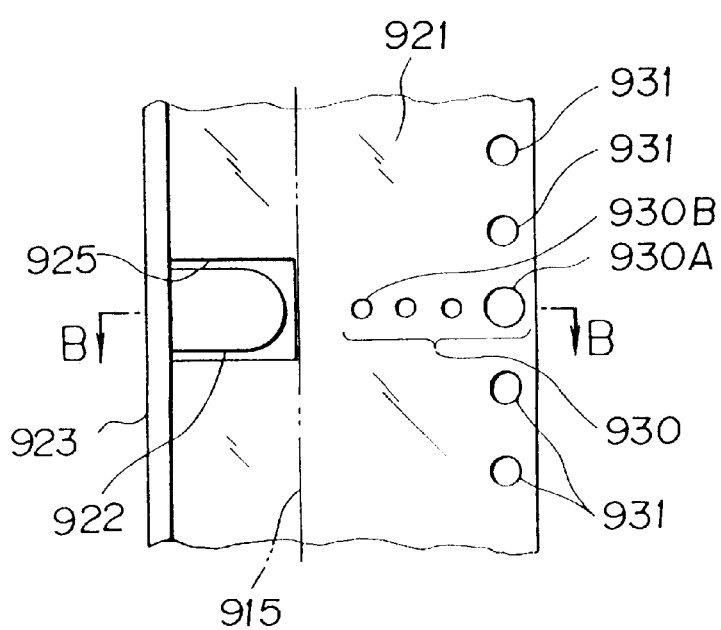
FIG. 4 is a frontal view of LEDs 22 and light reflectors 30 and 31 of the present invention.

The transparent display plate 921 is made of a transparent material, for example, acrylic fiber, and is mounted as close to the stocker 913 as possible without interfering with the carriage 914. The display plate 921 is attached by an appropriate means to four supports 924 formed on the upper and lower sides of the cabinet 911. The light reflectors 930 and 931 are V-shaped grooves cut into the display plate 921, as described below. The board 923 on which the LEDs 922 are mounted meets the left edge of the transparent display plate 921 at a right angle, and is attached to the cabinet 911. The LEDs 922 are positioned in the square cuts formed into the display plate 921 as shown in FIG. 4.

As shown in FIG. 2, the first light reflectors 930 and the second light reflectors 931 are V-shaped cuts on the surface of the display plate 921. As shown in FIG. 4, each of the second light reflectors 931 is cut into the transparent display plate 902 and corresponds to one of the disc storage positions 913A. The first light reflector 930 is comprised of a larger V-shaped cut (reflector) 930A, and three smaller V-shaped cuts (reflectors) 930B arranged horizontally in a row with the larger reflector 930A closest to the stocker 913. The first light reflectors 930 are positioned at the first level, the 10th level, the 20th level, and so on, in increments of 10, to the uppermost level, the 100th level in this embodiment. The LED 922 is positioned just beside the first light reflector 930.

Figure 5:
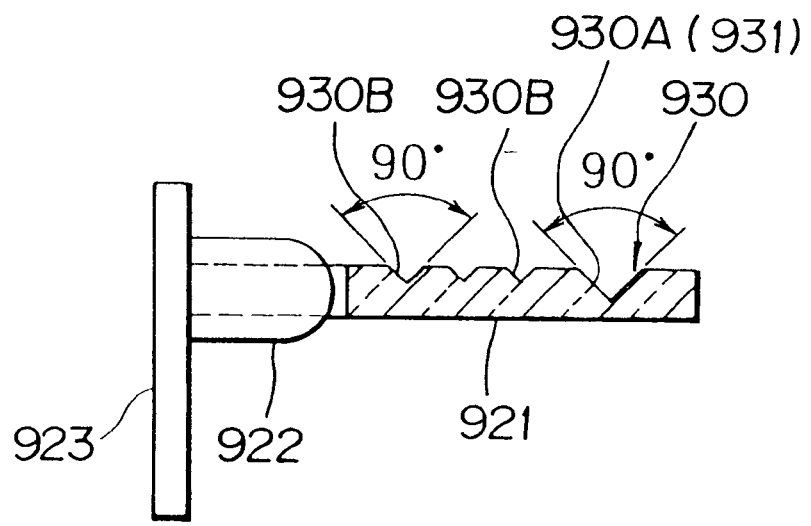
FIG. 5 is a cross-sectional view from line B—B of FIG. 4.
Figure 6:
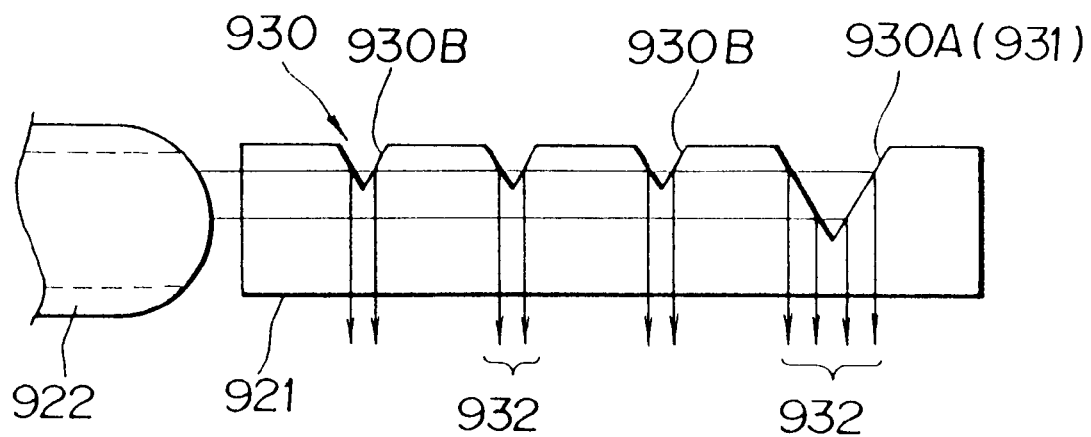
FIG. 6 is a cross-sectional view showing reflection of the light reflectors 930 and 931 of the present invention.

As shown in FIG. 5, these light reflectors 930 and 931 are V-shaped right-angled cuts opened in the back surface of the display plate, open toward the rear of the unit. When the LED 922 emits light, the light is transmitted through the transparent display plate 921, is reflected on the surfaces 930A and 930B, inclined at 45° of the first and second light reflectors 930 and 931, and the reflected light 932 is transmitted to the front of the unit. From the front, only the reflectors 930 and 931 reflect light to the user, so that the user can easily recognize each of the light reflectors 930 and 931. Further, because the display plate 921 is positioned close to the discs 12, even when the user views the transparent window 915 from an angle, the positions of the light reflectors 930 and 931 do not deviate from the positions of the discs 12, so that the user can accurately confirm the presence of stored discs 12.

Although the first and second light reflectors 930 and 931 are V-shaped cuts with 90° angles in this embodiment, it is possible to use an angle other than 90°, and also possible to use a different shape of cut so long as the light can be reflected toward the front of the unit.

Figure 7:
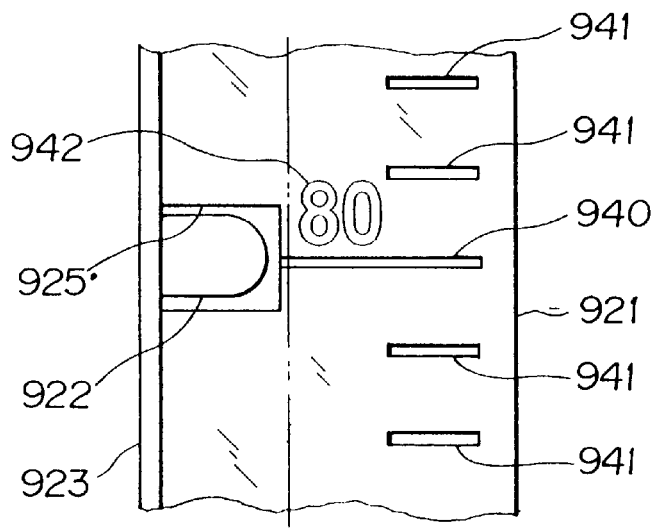
FIG. 7 is a frontal view showing another embodiment of the light reflectors 40 and 41 of the present invention.

Although the first and second light reflectors 930 and 931 are V-shaped cuts, the first and second light reflectors 940 and 941 can be made of square cuts with light reflecting angles as shown in FIG. 7, with the first light reflector 940 being longer than the second light reflectors 941 so that the user can distinguish between the two. Further, the labeling means 942 by which numbers (1, 10 . . . 100) representing the disc storage positions 913A are indicated, corresponding the first light reflectors, for example, may be in the form of Arabic numerals, characters, or other signs. In this embodiment, Arabic numerals are used. Such means 942 are also made as a V-shaped cuts, so that the numerals receiving the light from the LEDs 922 are illuminated as well, and the user can easily distinguish between them.

Although eleven LEDs 922 are used in this embodiment, the number of the LEDs 922 can be changed as long as the light reaches all of the light reflectors 930, 931, 940, and 941. Further, when different colors of light from the LEDs 922 can be used, creating a more colorful effect and making review of the disc storage positions 913A more easy. Moreover, all of the stocker 913 may be lit simultaneously, or only selected LEDs 922 may be used. For example, the LED 922 corresponding to the storage position 913A of the disc 12 which is being played back, may be selected separately.

Figure 8:
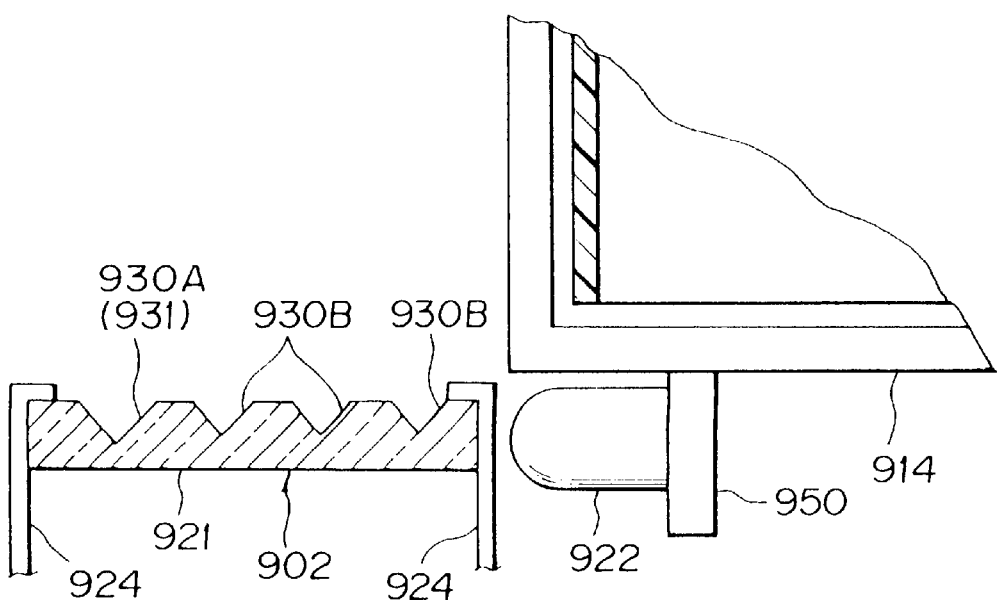
FIG. 8 is a cross-sectional view showing a position of the LED 22 of the present invention.

The LEDs 922 can be attached to areas other than the display plate 921; for example, to a board 950 attached on the carriage 914 as shown in FIG. 8. In this case, the display plate 921 and the LED 922 are positioned so that light from the LED 922 is transmitted from the right edge of the display plate 921. When the carriage 914 is moving, the LED 922 may be turned on and off, and when the carriage 914 stops, the LED 922 may be continuously lit. Accordingly, the user can easily determine whether or not the carriage 914 is moving or is stopped. The LEDs 922 may be positioned beside the display plate 921 and one or more LEDs 922 may be attached to the carriage 914.

According to the present invention, because the display plate is positioned close to the discs in the stocker, the positions of the light reflectors do not deviate from the positions of the discs. Further, because the light reflectors are lit, the user can easily locate the position of the disc and accurately confirm the presence of stored discs.

It will be obvious to those having skill in the art that many changes may be made in the above-described details of the preferred embodiment of the present invention. The scope of the present invention, therefore, should be determined by the following claims.

What is claimed is:

1. An auto disc changer having disc removal and loading means for removing discs from and loading discs into the auto disc changer, disc storage means for storing a plurality of discs, disc carriage means for transferring said discs to and from specified disc storage positions in said disc storage means, a cabinet in which the disc storage means and the disc carriage means are located, the cabinet including a transparent window allowing a user to view the disc storage means, and a disc storage position indication apparatus for said disc storage means by which the user can visually identify the disc storage positions in said disc storage means, the disc storage position indication apparatus comprising:

a transparent display plate inside the cabinet, the height of the transparent display plate being sufficient to cover all of the disc storage positions of said disc storage means;

a plurality of light reflectors formed into said display plate, said reflectors being spaced apart over the height of the display plate and being located at positions corresponding to a plurality of said disc storage positions, each of said light reflectors being formed by a distinct reflective face of said transparent display plate, the plurality of reflectors being composed of first and second sets of reflectors, the reflectors of the first set being visually distinct from the reflectors of the second set, and there being a predetermined number of reflectors of the second set between each two adjacent reflectors of the first set; and a light emitting source inside the cabinet for emitting light to said light reflectors, and wherein the light reflectors are positioned to reflect light received from the light emitting source out of the cabinet through the transparent window so that the user can readily count the disc storage positions and determine by number which of the disc storage positions are vacant and which are occupied.

2. An auto disc changer in accordance with claim 1, wherein said first and second sets of light reflectors are 90° V-shaped cuts.

3. An auto disc changer in accordance with claim 1, wherein said light emitting source is attached to said carriage means for transferring said disc to and from said disc storage means.

4. An auto disc changer in accordance with claim 1, wherein said first set of light reflectors have labeling means by which said user may locate said disc storage positions corresponding to said first set of light reflectors.

5. An auto disc changer in accordance with claim 1, wherein the light emitting source is spaced horizontally from the light reflectors.

6. An auto disc changer in accordance with claim 5, comprising at least two light emitting sources spaced horizontally from the light reflectors and spaced vertically from each other.

7. An auto disc changer in accordance with claim 1, comprising at least two light emitting sources for emitting light toward respective groups of light reflectors and a means for selectively energizing the light emitting sources.

8. An auto disc changer in accordance with claim 1, comprising at least two light emitting sources for emitting light toward respective groups of light reflectors and wherein the two light emitting sources emit light of different colors respectively.

9. An auto disc changer in accordance with claim 1, wherein said reflectors are formed by V-shaped cuts in the transparent display plate.

10. An auto disc changer in accordance with claim 1, wherein the display plate is positioned closer to the disc storage means than to the transparent window.

11. An auto disc changer in accordance with claim 1, wherein said light reflectors include a plurality of discrete light reflectors at positions corresponding to said plurality of disc storage positions respectively.

12. An auto disc changer according to claim 1, wherein the reflectors of the first set are larger than the reflectors of the second set.

13. An auto disc changer according to claim 1, wherein the reflectors of the first set are longer than the reflectors of the second set.

14. An auto disc changer according to claim 1, wherein each reflector is elongated in a direction perpendicular to the direction in which the reflectors are spaced apart and the reflectors of the first set are longer than the reflectors of the second set.

15. An auto disc changer according to claim 1, wherein there are nine reflectors of the second set between each two adjacent reflectors of the first set.

* * * * *